(12) United States Patent
Cleveland

(10) Patent No.: US 7,706,828 B2
(45) Date of Patent: *Apr. 27, 2010

(54) METHOD AND PROCEDURE FOR SELF DISCOVERY OF SMALL OFFICE OR HOME INTERIOR STRUCTURE BY MEANS OF ULTRA-WIDEBAND PULSE RANGING TECHNIQUES

(75) Inventor: Joseph Cleveland, Murphy, TX (US)

(73) Assignee: Samsung Electronic Co., Ltd., Suwon-si (KR)

( * ) Notice: Subject to any disclaimer, the term of this patent is extended or adjusted under 35 U.S.C. 154(b) by 1069 days.

This patent is subject to a terminal disclaimer.

(21) Appl. No.: 11/384,594

(22) Filed: Mar. 20, 2006

(65) Prior Publication Data

US 2007/0218949 A1    Sep. 20, 2007

(51) Int. Cl.
*H04B 7/00* (2006.01)

(52) U.S. Cl. ............................................ 455/522

(58) Field of Classification Search ................. 455/561, 455/522
See application file for complete search history.

(56) References Cited

U.S. PATENT DOCUMENTS 5,884,187 A * 3/1999 Ziv et al. ..................... 455/522

* cited by examiner

*Primary Examiner*—William D Cumming

(57) ABSTRACT

A small office/home office base transceiver station including an ultra-wideband transceiver that transmits pulses on directional antenna array elements and monitoring for reflections. Directions from which a large number of reflections are detected are presumed to correspond to the interior of the building within which the base transceiver station is located, while directions from which few or no reflections are detected are presumed to correspond to outside walls. Transmit power gain for directional antenna array elements used for communications are then set to reduce transmission of power in directions that might result in interference with adjacent base transceiver stations.

19 Claims, 7 Drawing Sheets

METHOD AND PROCEDURE FOR SELF DISCOVERY OF SMALL OFFICE OR HOME INTERIOR STRUCTURE BY MEANS OF ULTRA-WIDEBAND PULSE RANGING TECHNIQUES

TECHNICAL FIELD

The present disclosure is directed, in general, to wireless communication systems and, more specifically, to self-configuration of small office or home office wireless communication devices.

BACKGROUND

Inadequate coverage is a persistent problem in the quality of service of any wireless network. Natural and man-made obstacles frequently create radio frequency (RF) "holes" in the coverage area of a wireless network. As a result, voice and data call connections are often dropped when a wireless terminal, such as a cell phone or a similar mobile station, enters an RF hole. Mobile stations that are already in an RF hole may not be able to reliably establish new connections. Typical areas in which RF holes occur include homes, apartments, underground tunnels and office buildings.

Wireless communication networks complemented by small base transceiver stations (BTSs) located to provide coverage in RF holes can frequently result in coverage issues, such as interference resulting from neighboring devices even when such devices are configured to detect each other and adapt overall or directional transmit power accordingly. For instance, a pair of small office or home office (SOHO) base transceiver stations (BTSs) in adjacent buildings may not detect each other due to outside wall penetration losses. A mobile or "subscriber" unit between or inside one of the two buildings, however, may detect both, due to differences in distance, differences in interior versus exterior wall penetration losses, or both. This interference scenario is sometimes referred to as the "hidden node problem."

There is, therefore, a need in the art for automatically configuring wireless devices to avoid introducing significant interference outside the intended coverage area.

SUMMARY

An ultra-wideband transceiver that transmits pulses on directional antenna array elements and monitors for reflections is provided for use in a small office or home office base transceiver station for a wireless communications network. Directions from which a large number of reflections are detected are presumed to correspond to the interior of the building within which the base transceiver station is located, while directions from which few or no reflections are detected are presumed to correspond to outside walls. Transmit power gain for directional antenna array elements used for communications are then set to reduce transmission of power in directions that might result in interference with adjacent base transceiver stations.

The foregoing has outlined rather broadly the features and technical advantages of the subject matter disclosed so that those skilled in the art may better understand the detailed description that follows. Additional features and advantages will be described hereinafter that form the subject of the claims. Those skilled in the art will appreciate that they may readily use the conception and the specific embodiment(s) disclosed as a basis for modifying or designing other structures for carrying out the same purposes identified herein, as well as other purposes. Those skilled in the art will also realize that such equivalent constructions do not depart from the spirit and scope of the disclosed subject matter in its broadest form.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Figure 1:
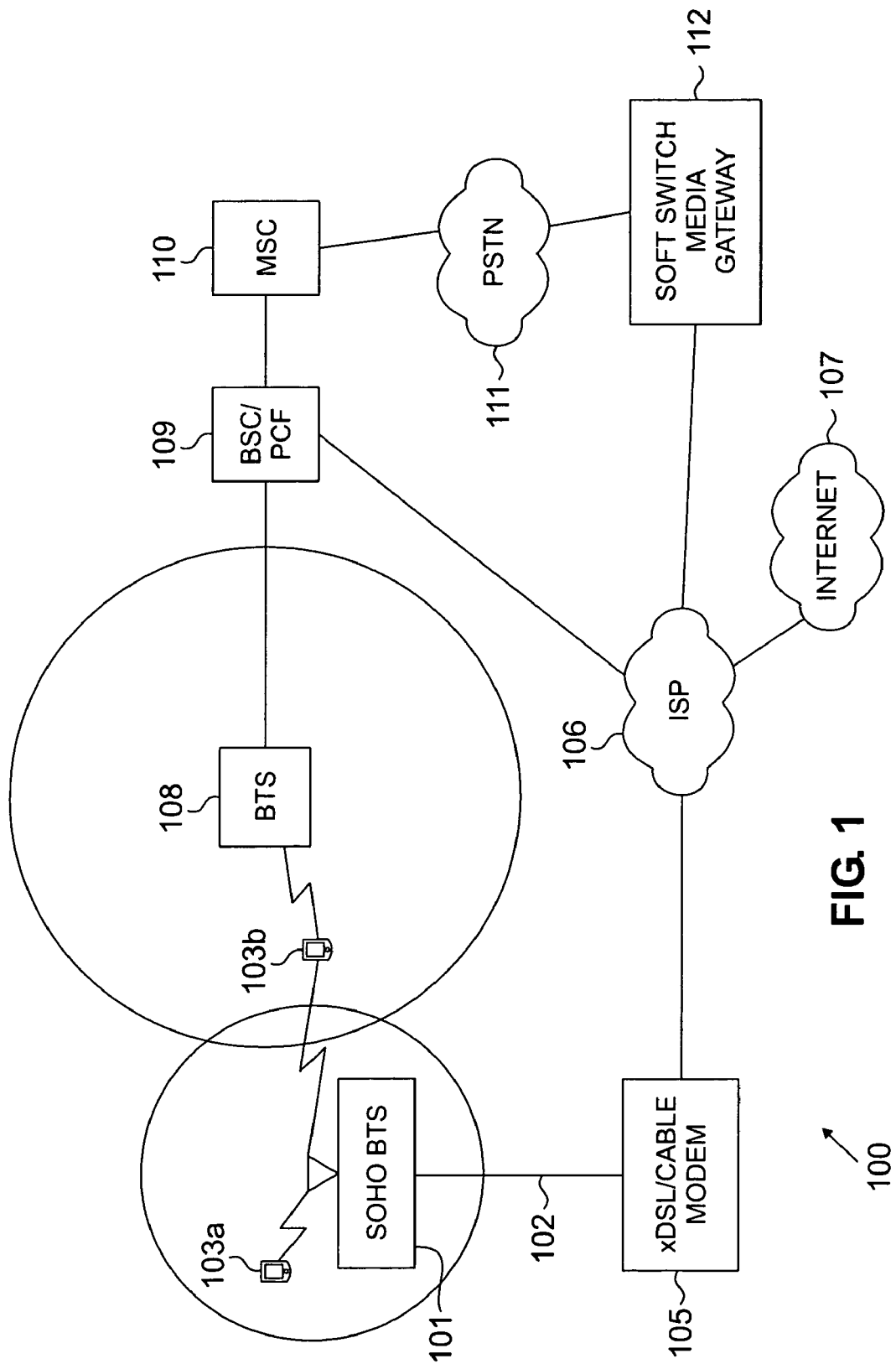
FIGS. 1 and 1A through 1B are high-level block diagrams of a wireless network and portions thereof having a small office/home office base transceiver station with self-discovery of interior structures therein according to one embodiment of the disclosure.
Figure 1A:
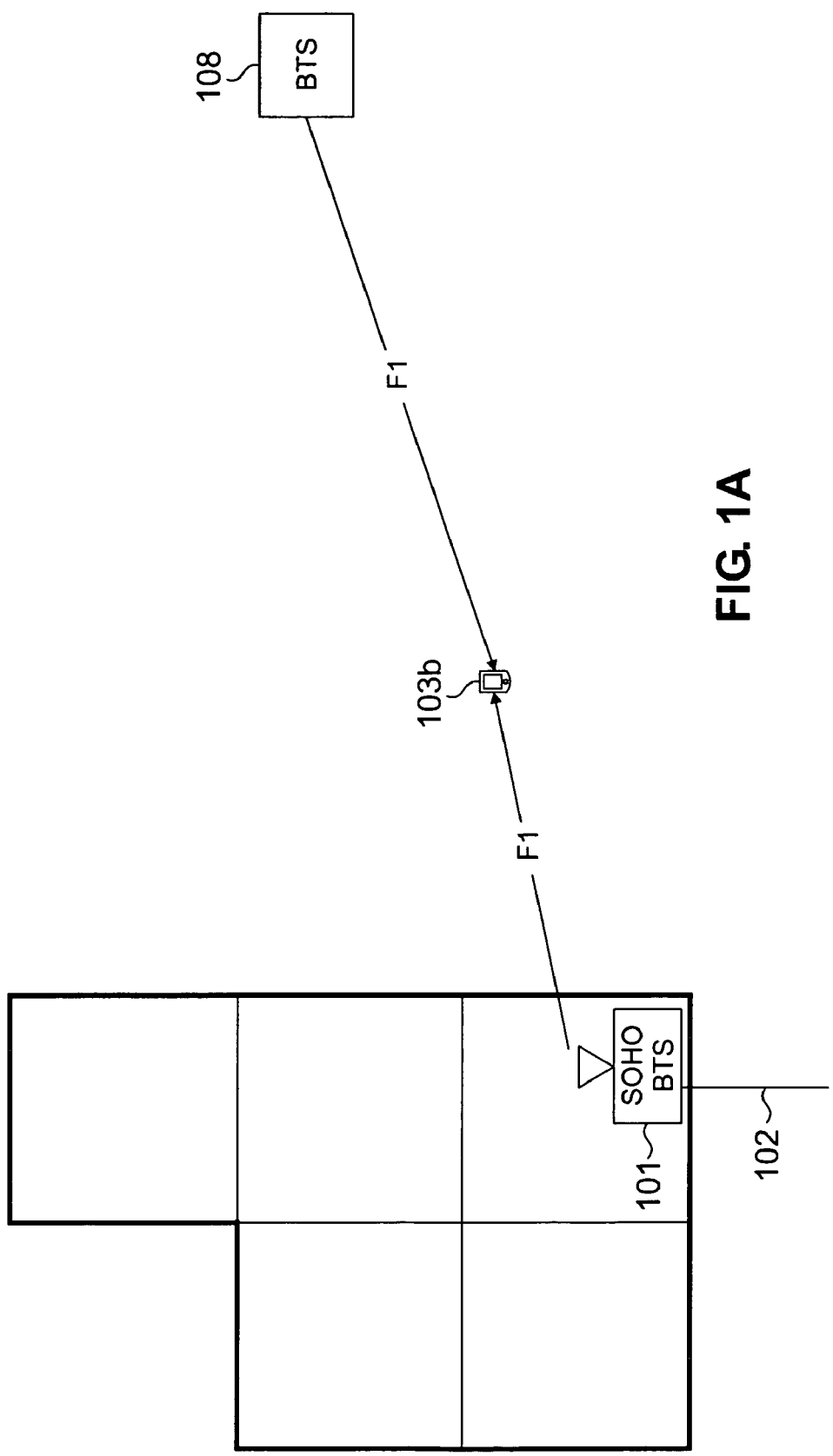
Figure 1B:
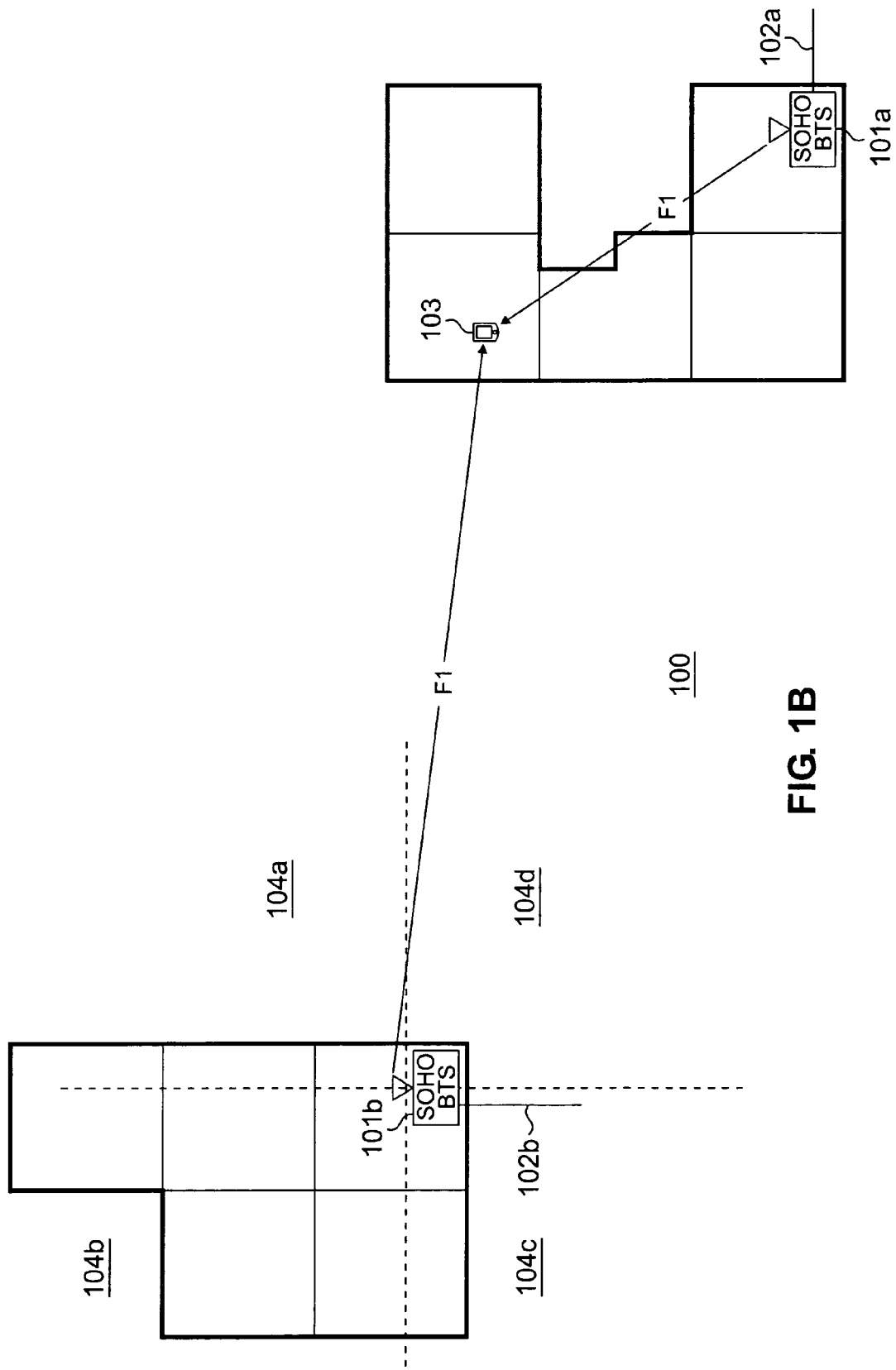

FIGS. 1 and 1A through 1B are high-level block diagrams of a wireless network and portions thereof having a small office or home office base transceiver station with self-discovery of interior structures therein according to one embodiment of the present disclosure. A wireless network 100 includes a small office or home office (SOHO) base transceiver station 101 ("SOHO BTS" or "small BTS") connected by an asymmetric digital subscriber line (ADSL) or symmetric digital subscriber line (SDSL) (collectively xDSL) or cable modem connection 105 to an Internet service provider (ISP) 106, and by ISP 106 to the Internet 107.

Wireless network 100 also includes a conventional wireless base transceiver station 108 coupled to, for example, a base station controller (BSC) 109 with optional Packet Control Function (PCF). BSC/PCF 109 may be coupled, in turn, to ISP 106 and by mobile switching center (MSC) 110 to public-switched telephone network (PSTN) 111. A soft switch media gateway 112 couples ISP 106 to PSTN 111 in the example shown.

Mobile devices 103a and 103b wirelessly communicate with either or both of SOHO BTS 101 and conventional BTS 108. To economically provide coverage within a small office or home office without limited interference to wireless services external to the small office or home office, adaptive interference control may be implemented. However, use of power control to a solitary dipole or monopole antenna does not allow selective reduction of transmitted radio frequency (RF) power only in directions that may cause interference. Adjustment of power into an antenna with omni coverage so as to minimize interference with either a conventional or "macro" BTS or an adjacent small BTS will greatly reduce interior coverage, thereby at least partially defeating the purpose of employing the small BTS to enhance interior coverage. Such solutions do not provide a means to tailor the signal to enhance internal coverage and limit external interference. Alternative smart antenna techniques using multiple transmit and receive paths incur significant additional costs.

The technique disclosed employs multiple narrow beam antennas fed by a common transmit chain with a power divider dividing the power into N separate signals (where N is any positive non-zero integer), each of which drives a variable attenuator and antenna element. The attenuator settings are determined based upon the small office or home office interior configuration.

For in-building application, a small BTS is located within the confines of the small office or home office, where the small BTS 101 provides sufficient transmit power to overcome attenuation of interior walls and floors for wireless communication with mobile device 103a that does not receive sufficient power from macro BTS 108 for wireless communication with the macro BTS 108. The small BTS 101 supplements a macrocell network where the coverage is poor due to propagation loss or obstructions, or where no wireless service is provided but xDSL or cable broadband services exists through wireline connections. However, where wireless communications through a macro BTS 108 is provided in the area including the small office or home office, the small BTS 101 should operate without introducing significant interference to the external coverage environment, but should instead place the transmitted power where needed within the small office or home.

As illustrate in FIG. 1A, small BTS 101 is employed to provide enhanced wireless coverage within a small office or home. Small BTS 101 includes a connection 102 to a wireless core network device such as a base station controller (BSC) or mobile switching center (MSC), or to a public switched data network (PSDN), via an Internet protocol (IP) network as depicted in FIG. 1. In the example shown, small BTS 101 operates on the same wireless channel F1 as a macro BTS 108, and potentially interferes with the signal reception at mobile device 103b from macro BTS 108. Operation using the same carrier channel is necessary where, for example, is not available for dedicated small BTS operation.

Because xDSL or cable access typically occurs at an outside wall, the small BTS will most likely be located near the xDSL or cable access point, and therefore near that outside wall. The small BTS 101 needs to transmit with sufficient power to overcome interior wall (and ceiling/floor) penetration losses in order to provide sufficient signal strength to a mobile device within a distant room. However, since the outside wall attenuation may be less that the total interior wall penetration loss, a strong signal may be transmitted through the outside wall to interfere with the external coverage provided by the macrocell network through macro BTS 108. This interference could be so sever as to cause call failure, loss of pilot and handoff failure for the mobile device.

As illustrated in FIG. 1B, the technique disclosed has particular applicability to a wireless network 100 that includes at least two small office or home office base transceiver stations 101a and 101b. A different form of interference may occurs when the operation of one small BTS 101a occurs in proximity to operation of another small BTS 101b, as when the small BTSs 101a and 101b are located in neighboring homes. This interference scenario is sometimes referred to as the "hidden node" problem. Interference at a mobile device 103 from adjacent small BTSs 101a and 101b may occur due to differences in outside wall penetration loss and total interior wall penetration losses. Differences in distances and/or wall penetration and propagation losses prevent the two small BTSs 101a and 101b from discovering each other, even though both are detected by mobile device 103.

Small BTSs 101a and 101b are located within the confines of an office building or home to supplement a macrocell network where either coverage is poor or there is no wireless service but broadband wireline service exists. Small BTSs 101a and 101b provide sufficient transmit power to overcome the attenuation of interior walls and floors in the building (depicted by the thinner lines) in which each is positioned, and inadvertently, also to overcome the attenuation of exterior walls (depicted by the thicker lines).

Small BTSs 101a and 101b are located proximate to a broadband wireline (e.g., T1, cable or digital subscriber line) access point for the respective buildings, which will typically be at an outside wall for a home or small office building. Each small BTS 101a and 101b has a connection 102a and 102b, respectively, to such broadband wireline communications system (not shown). It is assumed, for the purposes of the exemplary embodiment, that wall penetration losses and/or intervening distances are too great for small BTSs 101a and 101b to discover each other.

A fixed or mobile "subscriber" unit 103 capable of wireless communication with both small BTSs 101a and 101b is located within an overlapping coverage area of both small BTSs 101a and 101b when both small BTSs 101a and 101b transmit at full power in an omni-directional manner. Subscriber unit 103 may be any device having such communication capability such as a telephone, wireless electronic mail and/or Short Message Service (SMS) text messaging device, and/or a personal digital assistant (PDA), or a desktop or laptop computer, etc. Small BTSs 101a and 101b are each capable of communicating with at least subscriber unit 103 using any one or more of the IEEE 802.11, IEEE 802.16, IS-95 Code Division Multiple Access (CDMA) (also referred to as TIA-EIA-95 or "cdmaOne"), CDMA 2000, CDMA 1X, and/or CDMA 1X EV-DO standards.

Those skilled in the art will recognize that the components depicted and described herein form a portion of and operate in conjunction with a larger wireless communications network having a number of macrocells (such as but not limited to the network 100 depicted in FIG. 1), with small BTSs 101a and 101b and subscriber unit located in one such macrocell. For simplicity and clarity, however, only so much of the construction and operation of the overall wireless communications network and the components therein as is unique to the present disclosure or necessary for an understanding of the present disclosure is depicted in FIGS. 1A and 1B and described in detail herein.

Solely by way of example, and without intending to imply any limitation, communication by subscriber unit 103 with each small BTS 101a and 101b may be assumed to require overhead of +7 decibels referenced to one milliwatt (dBm), and to experience −37 decibels (dB) coupling loss and −20 dB propagation loss. For the purposes of illustration of the potential "hidden node" problem, a worst case of worse standard deviation losses at subscriber unit 103 for small BTS 101a (e.g., −1.28*16 dB) than for small BTS 101b (e.g., −1.28*12 dB) may be assumed. Wall penetration losses that are equal for interior and exterior walls at −10 dB for each wall may also be assumed. The wall penetration loss at subscriber station 103 for signals from small BTS 101a in that case would be −50 dB (penetration of five walls), versus −20 dB for signals from small BTS 101b (penetration of two walls). As a result, the received power at subscriber unit 103 from small BTS 101a would be approximately −120.5 dBm. On the other hand, the received power at subscriber unit 103 from small BTS 101b would be approximately −85 dBm. The difference may result in lost coverage and blocked or dropped communications, and pilot pollution for the pilot received from BTS 101a.

The above description of signal strength is based on omni-directional transmission by each small BTS 101a and 101b. In the embodiment of FIG. 1B, however, at least small BTS 101b (and preferably also small BTS 101a) is adapted to radiate radio frequency (RF) power in directions necessary for interior coverage, while reducing or eliminating the transmission of RF power in directions that might result in interference with communications between subscriber unit 103 and adjacent small BTS cells (e.g., small BTS cell 101a).

Figure 2:
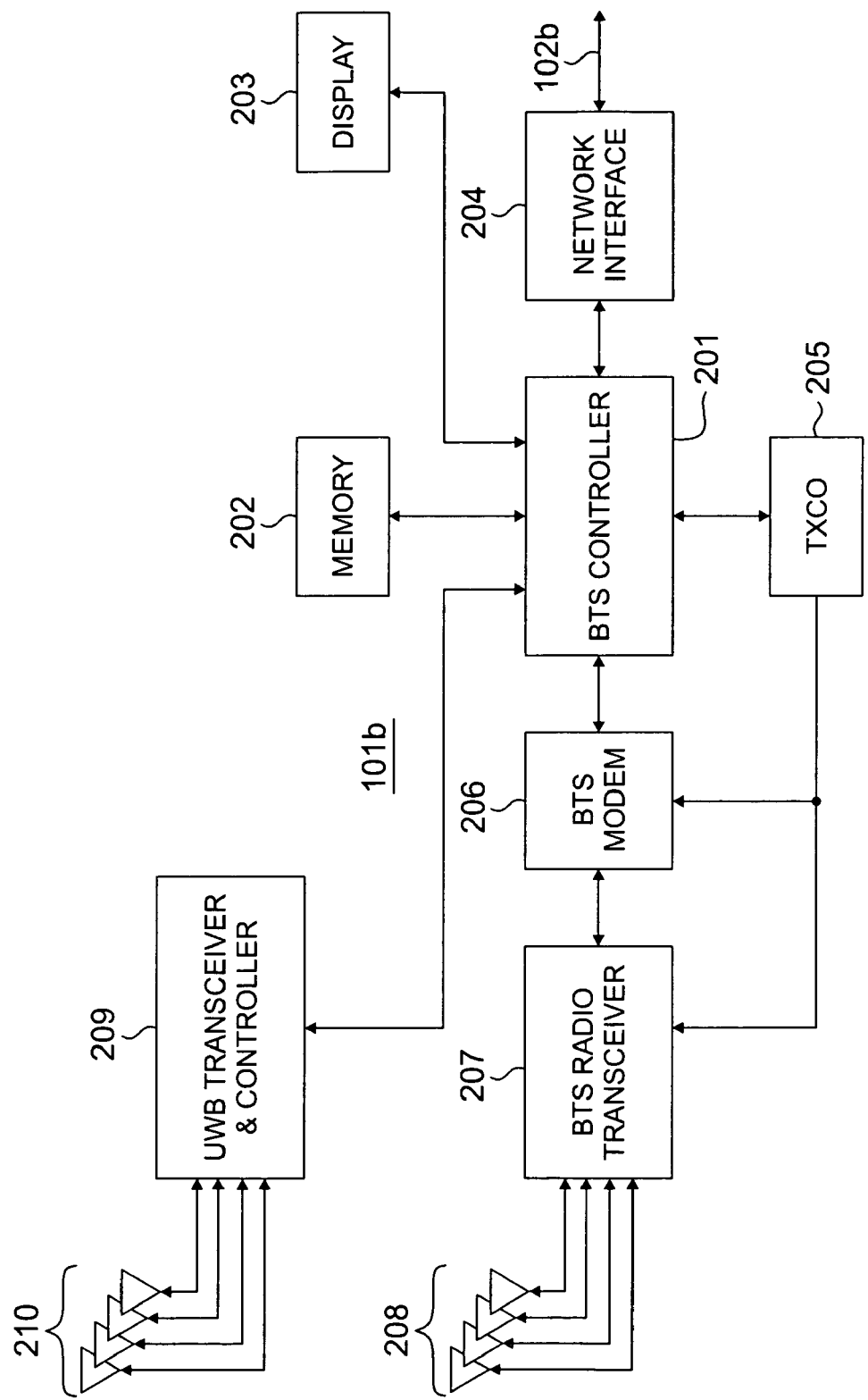
FIG. 2 is a high-level block diagram of a small office/home office base transceiver station with self-discovery of interior structures according to one embodiment of the disclosure.

FIG. 2 is a high-level block diagram of a small office or home office base transceiver station with self-discovery of interior structures according to one embodiment of the present disclosure. Small BTS 101b includes a controller 201, memory 202, a display 203, and network interface 204 to broadband wireline connection 102b, an oscillator 205 (a temperature-controlled crystal oscillator TCXO in the exemplary embodiment) providing a synchronization source, a modem 206, and a radio transceiver 207 coupled to an array of directional antenna elements 208. These components are constructed and operate in accordance with the known art, with the exception of controller 201 having additional programming described in further detail below.

Small BTS 101b also includes a transceiver and controller 209, preferably an ultra-wideband (UWB) radar transceiver, coupled to an array of directional antenna elements 210. While depicted as separate from antenna elements 208, those skilled in the art will recognize that both radio transceiver 207 and ultra-wideband radar transceiver and controller 209 may actually employ a single set of antenna elements, with signals switched from either under the control of controllers 201 and/or 209. Regardless, the antenna elements 210 employed by ultra-wideband radar transceiver and controller 209 form an adaptive antenna with directional gain for detecting interior structures and providing appropriate coverage within the small office or home.

To detect interior structures, the ultra-wideband radar transceiver and controller 209 transmits very short pulses at a periodic rate through each of the directional antenna elements 210. The pulse width is less than the time required by an RF signal to propagate between interior walls (for example 5 nanoseconds in duration with 100 nanoseconds between consecutive pulses), and after each periodic pulse the transmitter function of ultra-wideband radar transceiver and controller 209 turns off and the receiver function turns on to receive signals reflected from interior walls. To improve the signal-to-noise ratio of reflected pulses, the ultra-wideband radar transceiver and controller 209 maintains a running time-domain average over a large number of pulse cycles.

By using, for instance, beam-forming techniques or sector attenuation with the adaptive array 210 and transceiver electronics within ultra-wideband radar transceiver and controller 209, ultra-wideband radar transceiver and controller 209 can scan over a full 360° with a resolution depending on the number of elements within array 210 (e.g., approximately 90° sectors for four elements or approximately 60° sectors for six). Directions (ranges of directions) with many return signals are recognized by the BTS controller 201 as directions with many interior walls, while directions with few if any reflecting signals are recognized as having a close proximity to an outside wall.

When the discovery of interior structures is complete, the BTS controller 201 uses direction-of-arrival and amplitude data obtained from the ultra-wideband radar transceiver and controller 209 to set beam-forming coefficients for the BTS modem 206, or alternatively to set sector attenuation coefficients in the transmit RF path of adaptive antenna array transceiver 207. Modem 206 and transceiver 207 create transmit beams to cover the interior areas and to limit radiation into external areas.

Thus, for Example, the transmit power for small BTS 101b may be set to a first, higher value (e.g., "on") for sectors 104a-104c depicted in FIG. 1B and to a second, lower value (e.g., "off") for sector 104d. In this manner, small BTS 101b operates without introducing significant interference outside a desired coverage area.

Figure 2A:
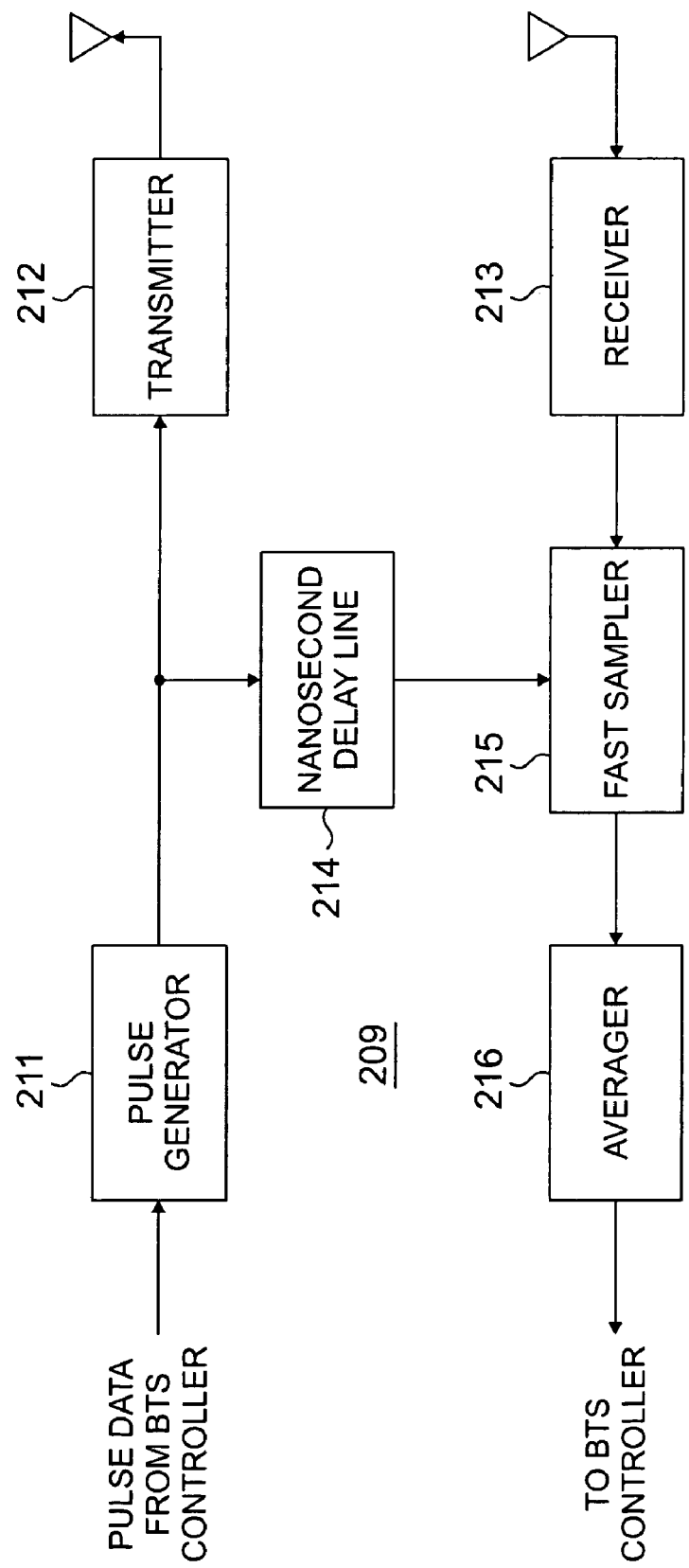
FIG. 2A is a high-level block diagram of an ultra-wideband range and direction finding module for a small office/home office base transceiver station with self-discovery of interior structures according to one embodiment of the disclosure

FIG. 2A is a high-level block diagram of an ultra-wideband range and direction finding module for a small office or home office base transceiver station with self-discovery of interior structures according to one embodiment of the present disclosure. Transceiver and controller 209 depicted in FIG. 2 includes a pulse generator 211 forwarding pulses to transmitter 212 under the control of BTS controller 201. Transmitter 212 is capable of being coupled to any of antenna elements 210 (concurrently or separately), and during detection of interior structures is selectively coupled to one of the antenna elements 210 at a time.

Transmitter 212 transmits the pulses then pauses for a given time interval. During the time interval, receiver 213 selectively coupled to the same one of the antenna elements 210 as the transmitter 212 samples, the antenna voltage for possible reflections. For this purpose, the pulse from generator 211 is sent to both transmitter 212 and to a delay line 214, which controls sampling of the received, reflected signal(s), if any. For any outside wall located proximate to the small BTS 101b, any reflected signals may arrive prior to the expiration of the delay introduced by the delay line 214, such that no signal reflections are recorded from that direction.

Since any reflected signal will be extremely weak, the many samples obtained by fast sampler 215 are averaged by averager 216 to obtain a suitable signal out of the ultra-wideband radar transceiver and controller 209. The output of averager 216 is returned to BTS controller 201, for use with other pulse data for the same antenna element and similar pulse data for the remaining antenna elements.

Figure 3:
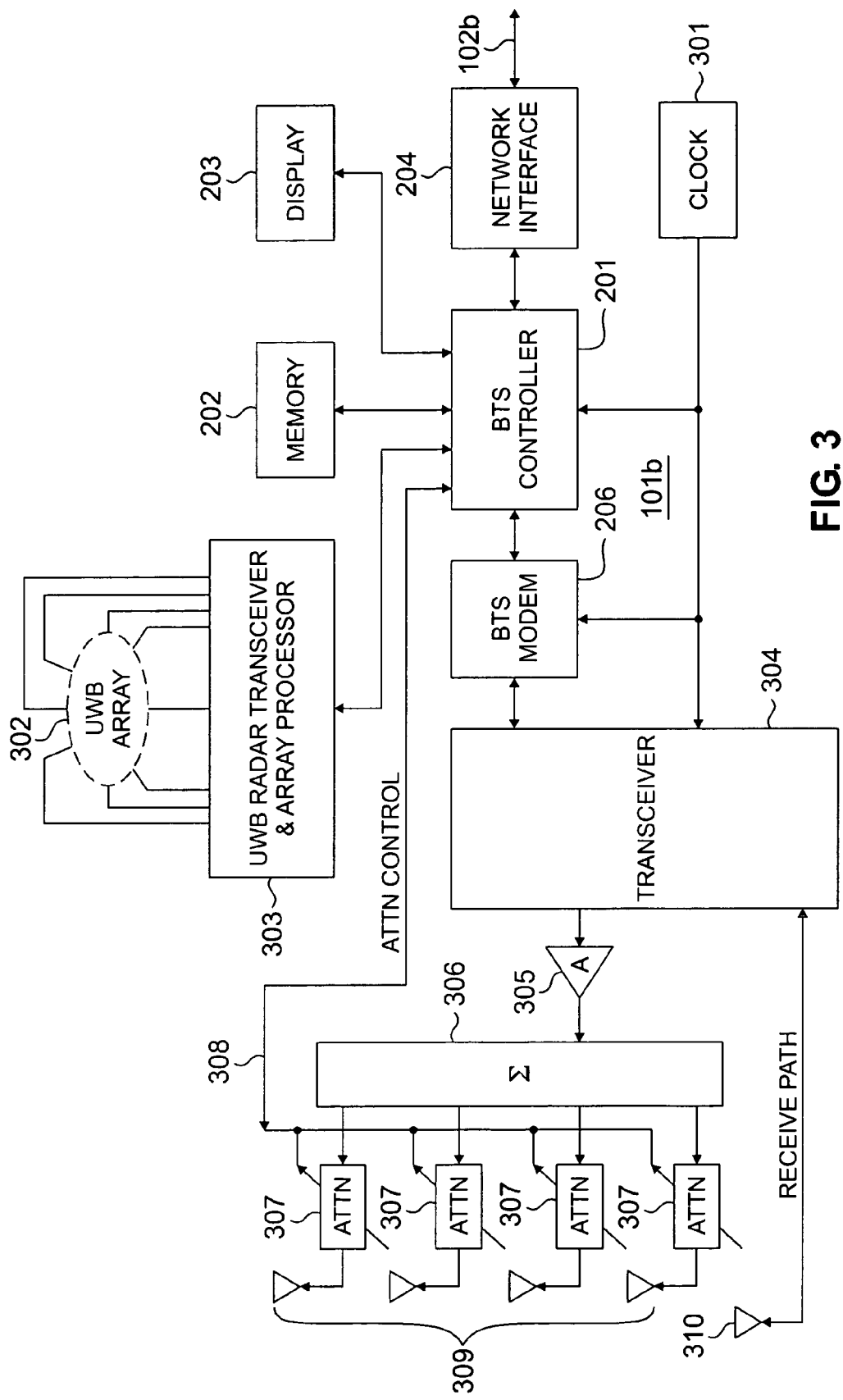
FIG. 3 is a high-level block diagram of a small office/home office base transceiver station with self-discovery of interior structures according to another embodiment of the disclosure.

FIG. 3 is a high-level block diagram of a small office/home office base transceiver station with self-discovery of interior structures according to another embodiment of the disclosure. In this embodiment, small BTS 101b includes a processor or controller 201, memory 202, display 203, and network interface 204, operating using a common clock source 301. An ultra-wideband (UWB) adaptive antenna array 302 and associated transceiver and array processor 303 are coupled to processor or controller 201. To detect interior structures, the ultra-wideband radar transceiver and array processor 303 transmits very short pulses at a periodic rate through each of the UWB directional antennas within array 302. The pulse width is less than the time required by an RF signal to propagate between interior walls, and after each periodic pulse the transmitter function of ultra-wideband radar transceiver and array processor 303 turns off and the receiver function turns on to receive signals reflected from interior walls.

By using beam forming techniques with the adaptive antenna array 302 and transceiver and array processor 303, the UWB module can scan for reflecting surface over a full 360°. To improve the signal-to-noise ratio of reflected pulses, the ultra-wideband time domain processor 303 maintains a running average over a large number of pulse cycles. Directions (or ranges of directions) with many one or few reflecting signals are recognized as having a close proximity to an outside wall.

In this embodiment, the common wireless communications transmit chain from transceiver 304, which includes an amplifier (A) 305 and a radio frequency splitter (Σ) 306 in the example shown, is split into multiple paths. The transmit power for each path is independently controlled by a variable attenuator (ATTN) 307 under the control of a signal 308 from processor/controller 201. Each transmit signal path is connected to a different directional antenna or antenna element 309, with four such transmit paths being illustrated in this example. A separate receive path from antenna element 310 to transceiver 304 is provided.

When the discovery of the interior structures is complete, the processor or controller 201 uses direction-of-arrival and amplitude data obtained from the UWB transceiver and time domain array processor 303 to set the attenuation value for each attenuator 307 within a particular transmit path in order to provide interior coverage while limiting transmission power outside the small office or home.

Figure 4:
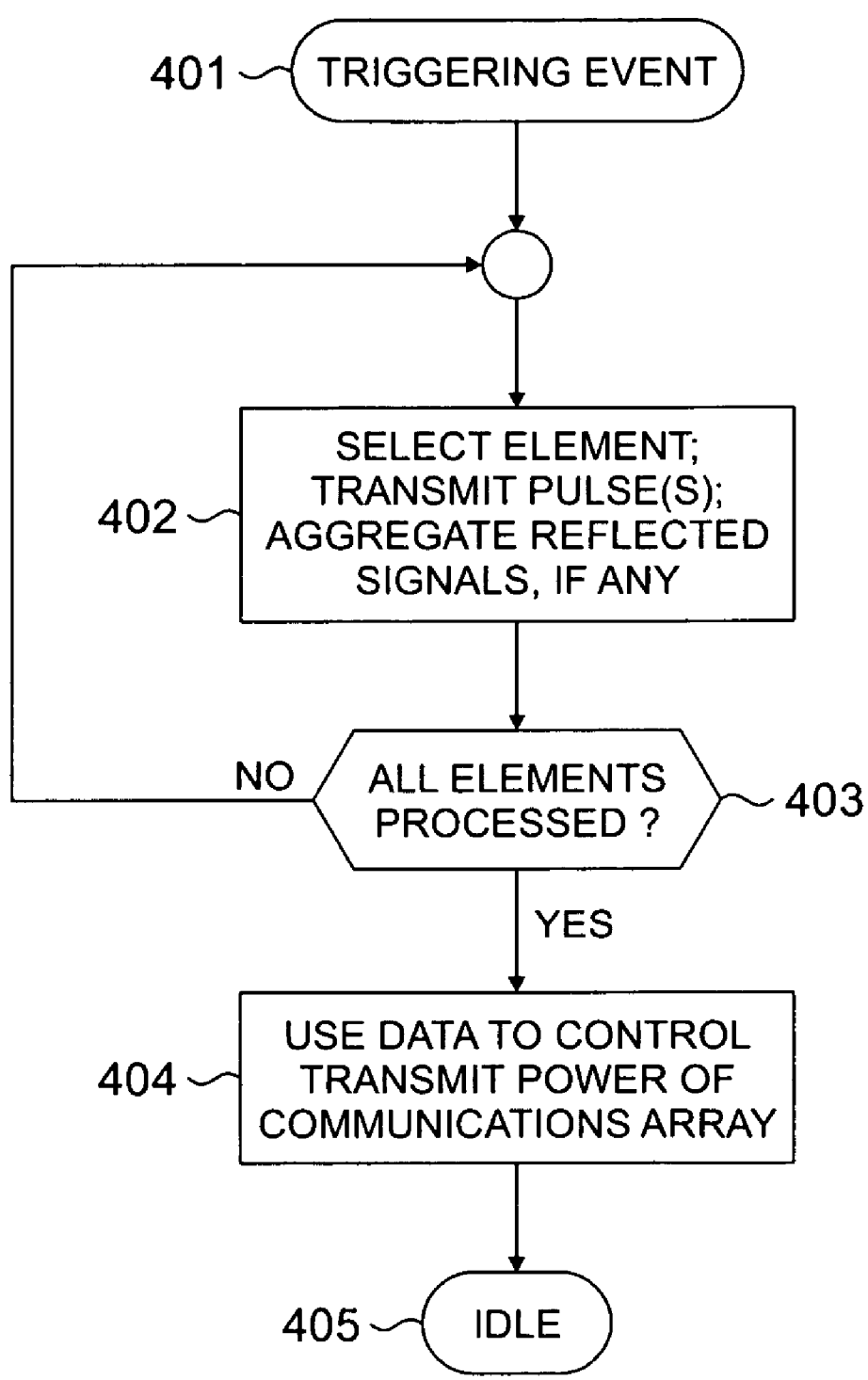
FIG. 4 is a high level flowchart for a process of detecting interior structures in order to control directional transmit power in a small office/home office base transceiver station according to one embodiment of the present disclosure.

FIG. 4 is a high level flowchart for a process of detecting interior structures in order to control directional transmit power in a small office or home office base transceiver station according to one embodiment of the present disclosure. The process 400 is performed by BTS controller 201 in conjunction with ultra-wideband transceiver and controller 209, BTS modem 206 and BTS radio transceiver 207.

The process begins with a triggering event (step 401), which may be the small BTS 101a, 101b being powered up, expiration of a predetermined period, or a change in the orientation of the small BTS as determined from an orientation sensor such as a magnetic compass (not shown) or a similar device. One of the antenna array elements is then selected, one or more pulses transmitted on the selected array element, and reflected signal(s), if any, received by each element of the antenna array are sampled in time and the samples are averaged (step 402) by array processor 303 with previously received and sampled signals in respective time bins, then the averaged samples are stored in memory (not shown). After the transmission of the set of pulses from the selected antenna element and the averaging of the corresponding received signals, the set of averaged signals in the time bins are processed by array processor 303 with known time domain techniques to determine the time of arrival and amplitude of reflected signals received by each antenna element. Unless all elements within the antenna array have been processed (step 403), the process is repeated for another element.

Once all elements within the antenna array have been processed, the data determined from any reflected signals is used to control transmit power to corresponding elements of the communications antenna array (step 404). The process then becomes idle (step 405) until another triggering event occurs.

In accordance with the present disclosure, a small BTS or repeater adaptively reduces adjacent cell interference based on position and orientation data determined relative to interior structures, without being able to invoke interference reduction based on terminal pilot signal reports received by an interference management server adjusting omni-directional transmit power Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A system for configuring a base transceiver station having one or more antennae forming a plurality of antenna elements, the antenna elements selectively directing signals towards one or more of a plurality of different areas relative to a location of the base transceiver station, the system comprising:
   a detector configured to determine one or more areas among the plurality of different areas that are to receive signals transmitted at a higher of at least two transmit powers and to determine one or more areas among the plurality of different areas that are to receive the signals transmitted at a lower of the at least two transmit powers; and
   a controller selectively directing delivery of transmit power to the antenna elements based upon a determination by the detector for each of the areas,
   wherein the plurality of antenna elements further comprises an array of antenna elements, each antenna element configured to selectively direct signals towards a different one of the plurality of different areas.

2. The system according to claim 1, wherein the detector determines one or more areas among the plurality of different areas that are to receive signals transmitted at a higher of at least two transmit power by detecting interior structures within a building in which the base transceiver station is located.

3. The system according to claim 2, wherein the detector further comprises:
   a transmitter configured to transmit radio frequency signals into each of the areas; and
   a receiver configured to detect reflection of the radio frequency signals off the interior structures.

4. The system according to claim 3, wherein the radio frequency signals are ultra-wideband signals.

5. The system according to claim 3, wherein a controller within the base transceiver station is configured to correlate a receipt of multiple reflections of the radio frequency signals by the receiver from one of the plurality of different areas with a presence of interior structures in the respective area.

6. The system according to claim 3, wherein the detector further comprises:
a delay line between a transmit path for the transmitter and a receive path for the receiver and configured to receive pulses generated for transmission by the transmitter, the receive path configured to employ an output of the delay line to control sampling of any reflected signals received by the receiver such that reflections from structures within a predetermined distance of the base transceiver station are not sampled.

7. The system according to claim 6, wherein each antenna element comprises a patch antenna.

8. The system according to claim 1, wherein the one or more antennae further comprises:
a first array of antenna elements, each antenna element configured to selectively direct ultra-wideband radio frequency signals towards a different one of the plurality of different areas; and
a second array of antenna elements corresponding in orientation to the first array, each antenna element within the second array configured to selectively direct communication radio frequency signals towards a different one of the plurality of different areas,
wherein the detector is configured to employ the first array while the second array is selectively employed for communication with other devices within a wireless communication network.

9. A base transceiver station including the system according to claim 1, the base transceiver station further comprising:
an interface to a broadband wireline connection; and
a communications transceiver coupled to either the plurality of antenna elements or a separate set of antenna elements within the one or more antennae, each antenna element being coupled to the communications transceiver configured to receive communications signals from the communications transceiver and configured to selectively direct the received communications signals towards one of the plurality of different areas,
wherein the controller is configured to selectively direct delivery of transmit power for the communications signals to antenna elements receiving the communications signals.

10. A wireless communications network including the base transceiver station according to claim 9, the wireless communications network further comprising:
an other base transceiver station that does not detect communications signals transmitted by the base transceiver station; and
a subscriber unit configured to receive detectable communications signals from the other base transceiver station but not from the base transceiver station.

11. A method for configuring a base transceiver station having one or more antennae forming a plurality of antenna elements, the antenna elements selectively directing signals towards one or more of a plurality of different areas relative to a location of the base transceiver station, the method comprising:
determining if one or more areas among the plurality of different areas are to receive signals transmitted at a higher of at least two transmit powers and determining if one or more areas among the plurality of different areas are to receive the signals transmitted at a lower of the at least two transmit powers;
selectively directing delivery of transmit power to the antenna elements based upon a determination by the detector for each of the areas; and
employing an array of antenna elements, each antenna element configured to selectively direct signals towards a different one of the plurality of different areas.

12. The method according to claim 11, further comprising:
determining if one or more areas among the plurality of different areas are to receive signals transmitted at a higher of at least two transmit power by detecting interior structures within a building in which the base transceiver station is located.

13. The method according to claim 12, further comprising:
transmitting radio frequency signals into each of the plurality of different areas; and
detecting reflection of the radio frequency signals off the interior structures.

14. The method according to claim 13, further comprising:
correlating a receipt of multiple reflections of the radio frequency signal from one of the plurality of different areas with a presence of interior structures in the respective area.

15. The method according to claim 13, further comprising:
employing a delay line between a transmit path for transmission of ultra-wideband radio frequency signals and a receive path for receiving ultra-wideband radio frequency signals, the delay line configured to receive pulses generated for transmission, the receive path configured to employ an output of the delay line to control sampling of any reflected signals received by the receive path such that reflections from structures within a predetermined distance of the base transceiver station are not sampled.

16. The method according to claim 11, further comprising:
employing a first array of antenna elements, each antenna element configured to selectively direct ultra-wideband radio frequency signals towards a different one of the plurality of different areas in determining if one or more areas among the plurality of different areas are to receive signals transmitted at the higher of the at least two transmit powers and in determining if one or more areas among the plurality of different areas are to receive the signals transmitted at the lower of the at least two transmit powers; and
employing a second array of antenna elements corresponding in orientation to the first array for communication with other devices within a wireless communication network, each antenna element within the second array configured to selectively direct communication radio frequency signals towards a different one of the plurality of different areas.

17. A base transceiver station comprising:
a base transceiver station controller;
a communications transceiver coupled to the base transceiver station controller and to a first array of antenna elements, each antenna element configured to selectively direct communications signals to a different one of a plurality of ranges of directions originating from the base transceiver station; and
a detector transceiver coupled to the base transceiver station controller and to a second array of antenna elements having a number and orientation corresponding to the first array, the detector transceiver configured to transmit discovery radio frequency signals in each of the ranges of directions and configured to determine in which of the plurality of ranges of directions reflected signals with at least a predetermined delay are received,
wherein the base transceiver station controller is configured to control delivery of transmit power by the communications transceiver to each of the antenna elements in the first array for communications radio frequency signals based upon whether reflected signals with at least a predetermined delay are received from a corresponding range of directions by the detector transceiver.

18. The base transceiver station according to claim 17, wherein the detector transceiver further comprises:
- a transmit path configured to transmit discovery radio frequency signal pulses;
- a receive path configured to receive reflected radio frequency signal pulses;
- a delay line between the transmit path and the receive path configured to control sampling of the receive path; and
- an averager configured to aggregate samples of the reflected radio frequency signal pulses obtained during sampling of the receive path.

19. The base transceiver station according to claim 17, wherein for each of the antenna elements within the second array, the detector transceiver is configured to:
- transmit a plurality of discovery pulses on the respective element,
- sample reflections of each of the discovery pulses arriving at the respective antenna element with a least a predetermined delay, and
- aggregate sampled reflections.

* * * * *

UNITED STATES PATENT AND TRADEMARK OFFICE
CERTIFICATE OF CORRECTION

PATENT NO. : 7,706,828 B2  
APPLICATION NO. : 11/384594  
DATED : April 27, 2010  
INVENTOR(S) : Joseph Cleveland Page 1 of 1

It is certified that error appears in the above-identified patent and that said Letters Patent is hereby corrected as shown below:

Column 3, line 43, delete "application" and replace with --applications--; and

Column 4, line 3, insert --spectrum-- after the term "example".

Signed and Sealed this

Twenty-second Day of March, 2011

David J. Kappos
*Director of the United States Patent and Trademark Office*